(No Model.)

G. W. ASHCRAFT.
PLANTER AND FERTILIZER DISTRIBUTER.

No. 528,520. Patented Nov. 6, 1894.

Witnesses.
A. Ruppert.
G. B. Fowlis.

Inventor.
George W. Ashcraft.
Per
Thomas P. Simpson
atty

UNITED STATES PATENT OFFICE.

GEORGE W. ASHCRAFT, OF CAVE SPRING, ALABAMA.

PLANTER AND FERTILIZER-DISTRIBUTER.

SPECIFICATION forming part of Letters Patent No. 528,520, dated November 6, 1894.

Application filed March 8, 1894. Serial No. 502,838. (No model.)

*To all whom it may concern:*

Be it known that I, GEORGE W. ASHCRAFT, a citizen of the United States, residing at Cave Spring, in the county of Fayette and State of Alabama, have invented certain new and useful Improvements in Planters and Fertilizer-Distributers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a planter which will conveniently serve the purpose for corn, cotton and peas as hereinafter described.

Figure 1:
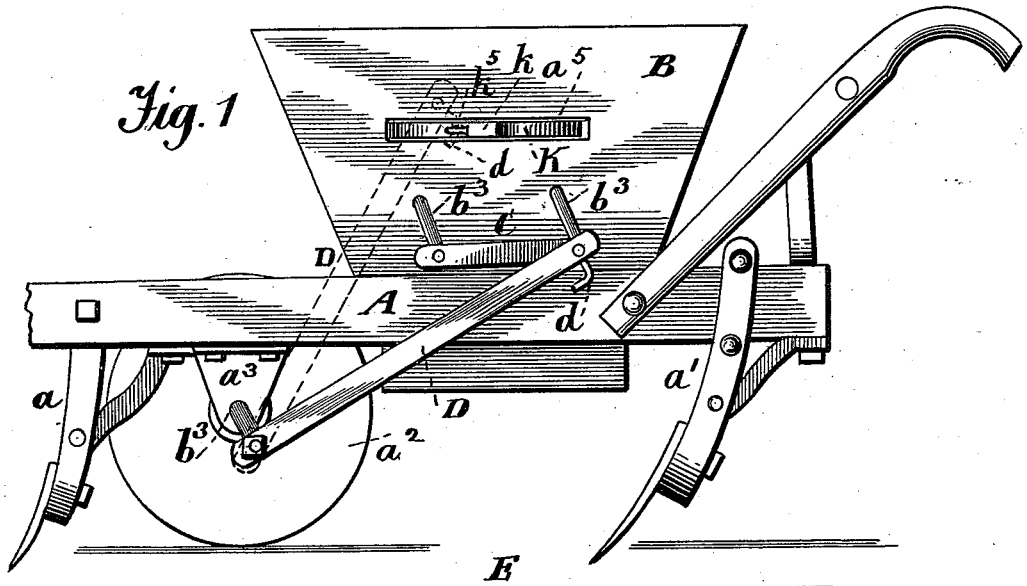
Figure 2:
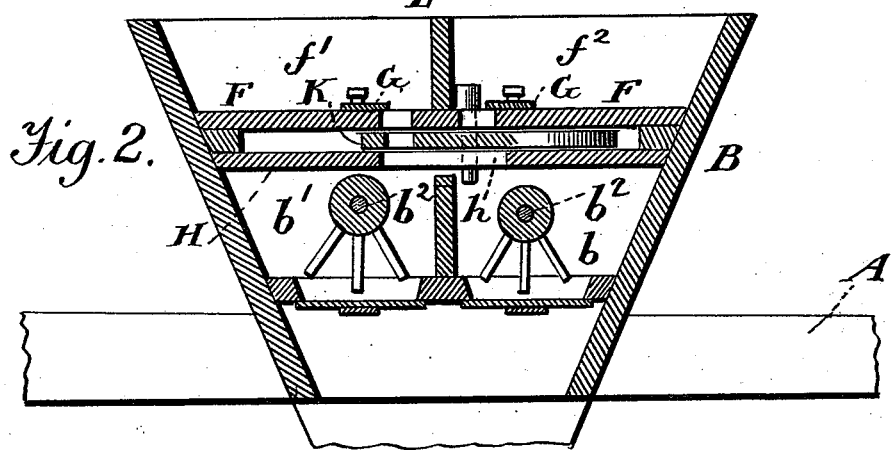
Figure 3:
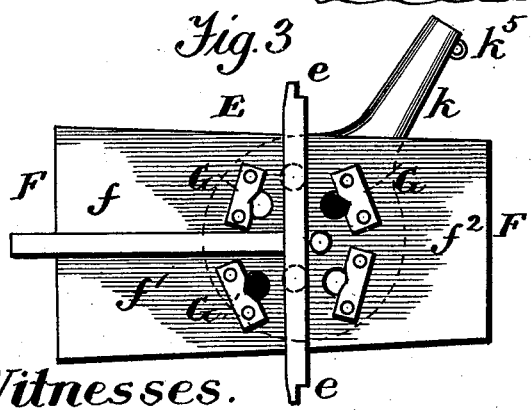
Figure 4:
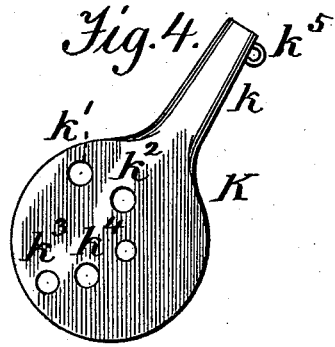

Figure 1 of the drawings is a side elevation; Fig. 2, a vertical longitudinal section; Fig. 3, a plan view of the corn and pea attachment; Fig. 4, a detail view of the vibrating dropper.

In the drawings, A represents the planter frame which is provided on the under side with a furrow-opening plow on a standard $a$, two covering plows on the standards $a'$ $a'$ at the rear and a disk-wheel $a^2$ in bearings $a^3 a^3$.

B is the hopper which contains at bottom the two chambers $b$ $b'$, the front one for the fertilizer and the rear one for the cotton seed. In each chamber $b$ $b'$ is journaled a shaft $b^2$ having a crank $b^3$ on the outside and vertical agitator arms on the inside. Under these agitators are the outlets and cross slides to regulate the feed of fertilizer and seed. The two cranks $b^3$ $b^3$ are connected by a bar C while one is connected by a pitman D with the crank on the outer end of the disk wheel shaft $b^3$ so that the rotation of the disk-wheel will vibrate the agitators in the chambers $b$ $b'$.

E is an attachment which fits into the upper part of hopper by a groove and tenon joint $e$ and is therefore removable.

The board F is the bottom of a corn chamber $f$ and a pea chamber $f'$ in the rear and of a fertilizer chamber $f^2$ in the front the chambers $f f'$ having each one exit hole and the front chamber two outlets at the bottom while each hole is provided with a plate G to regulate the quantity of seed or fertilizer which is to be sown.

Beneath and parallel to board F is a board H cut out on each side at $h$ $h$ to allow the seed and fertilizer to drop into the chambers $b$ $b'$. Between the two boards is an eccentrically pivoted disk K having four holes $k'$ $k^2$ $k^3$ $k^4$ to correspond to the holes in the board F and provided with an arm $k$ which connects by an eye $k^5$ with a hook $d$ at the end of pitman D so as to be vibrated by the rotation of the disk wheel $a^2$. By this means, the corn is dropped at the proper distance between the hills and the peas between the hills of corn, the fertilizer being dropped in the same places before the corn so as to be slightly covered with a little fine dirt before the seed falls.

$a^5$ is a hopper slot for the arm $k$.

Having thus described all that is necessary to a full understanding of my invention, what I claim as new, and desire to protect by Letters Patent, is—

The hopper of a planter having the top chambers $f'$ $f^2$ $f^3$ and the bottom chambers $b$ $b'$, the horizontal boards F H and, between said boards, the pivoted eccentric dropper K, the upper and lower chambers communicating with each other through the dropper and the dropper-handle $k$ connecting with its operative mechanism, all combined, constructed and arranged to operate as and for the purposes set forth.

In testimony whereof I affix my signature in presence of two witnesses.

GEORGE W. ASHCRAFT.

Witnesses:
JAMES J. RAY,
JOHN B. SANFORD.